United States Patent [19]

Maeda

[11] Patent Number: 4,536,805

[45] Date of Patent: Aug. 20, 1985

[54] IMAGE SIGNAL RECORDING-REPRODUCING DEVICE

[75] Inventor: Masaya Maeda, Kanagawa, Japan

[73] Assignee: Canon Kabushiki Kaisha, Tokyo, Japan

[21] Appl. No.: 396,317

[22] Filed: Jul. 8, 1982

[30] Foreign Application Priority Data

Jul. 15, 1981 [JP] Japan .................................. 56-110518
Jul. 15, 1981 [JP] Japan .................................. 56-110519
Jul. 15, 1981 [JP] Japan .................................. 56-110520

[51] Int. Cl.³ ...................... H04N 5/782; G11B 27/00
[52] U.S. Cl. ..................................... 360/14.1; 358/182
[58] Field of Search ..................... 360/13, 14.1–14.3, 360/33.1, 84, 107, 70; 358/182, 183

[56] References Cited

U.S. PATENT DOCUMENTS

| | | | |
|---|---|---|---|
| 3,152,223 | 10/1964 | Wessels | 360/31 |
| 3,157,739 | 11/1964 | Okamura | 360/84 |
| 4,163,262 | 7/1979 | Kaemmerer | 360/70 |
| 4,325,088 | 4/1982 | Wright | 360/14.2 |
| 4,355,332 | 10/1982 | Beeson | 360/14.1 |
| 4,389,680 | 6/1983 | Gramling | 360/84 |

OTHER PUBLICATIONS

Bates, "Cut/Lap: A New Method for Programmable Fades and Soft Edit Transitions Using a Single Source VTR", SMPTE Journal, vol. 88, 3/79.

*Primary Examiner*—Robert L. Richardson
*Attorney, Agent, or Firm*—Toren, McGeady, Stanger, Goldberg & Kiel

[57] ABSTRACT

In the disclosed image signal recording-reproducing device, a first head records and reproduces an image signal and a second head upstream of the first head on the recording medium reproduces an output which is mixed with a predetermined image signal and recorded on the recording medium.

12 Claims, 7 Drawing Figures

IMAGE SIGNAL RECORDING-REPRODUCING DEVICE

BACKGROUND OF THE INVENTION

1. Field of the Invention

The present invention relates to image signal recording and reproducing devices, particularly devices which can reproduce special effects. Below, the present invention is described in connection with a helical scan type magnetic image reproducing device (VTR).

2. Description of the Prior Art

Quite recently, home VTRs have become popular and are very often used not only for recording TV broadcasting programs but also for making home motion pictures with a compact VTR and a compact color camera.

Increased demands have been made for a VTR which can simply perform an effective change of scenes by overlapping a preceding scene with a following scene or by folding out the preceding scene or folding in the following scene. However, until these effects have been obtained, as shown in FIG. 1, by mixing the image signals from two VTRs, (VTR1, VTR2) or from one camera and one VTR (VTR1) in a mixer 100, whose mixing ratio is changed to form an overlap portion to be delivered to another VTR (VTR3). In this case two VTRs or one camera and one VTR have to be driven in synchronism so that a synchronizable VTR and camera are required. Furthermore, this makes it necessary for most users to have two or more VTRs on hand so that the equipment becomes large and costly, both of which are quite inconvenient. Hence, on a practical basis, present systems are unsuitable for such special effects.

SUMMARY OF THE INVENTION

It is accordingly an object of the present invention to provide an image signal recording-reproducing device so designed that the above-mentioned special effect can easily be obtained by means of one device in a remarkably simple structure. To do this, second heads are provided for tracing the track position in advance of first heads and the signal reproduced with the second heads and a second image signal are mixed and recorded on the recording medium via the first heads.

In this way it is easily possible to make the picture gradually dark or bright or change the picture over from the one scene to the other scene gradually.

Further, other objects and features of the present invention will be apparent from the detailed description made in connection with the accompanying drawings.

DETAILED DESCRIPTION OF THE PREFERRED EMBODIMENT

Figure 1:
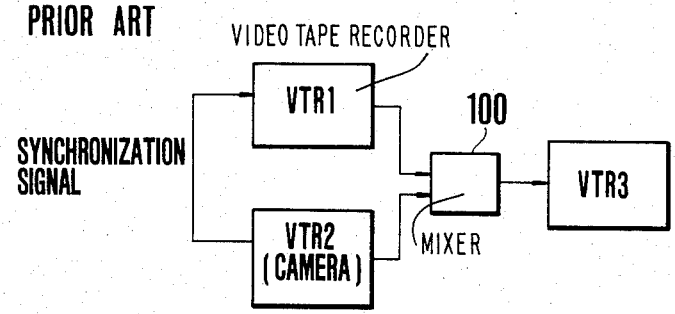
FIG. 1 is a block diagram of a conventional arrangement.
Figure 2:
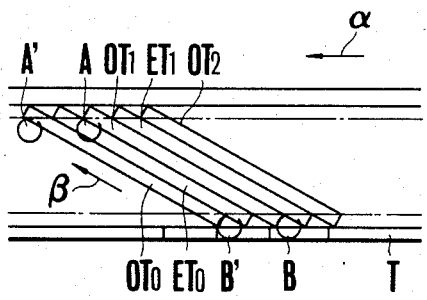
FIG. 2 shows an embodiment of the magnetic recording-reproducing device of the present invention and the manner in which the heads trace the tracks.
Figure 3:
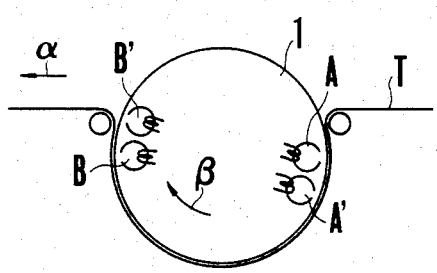
FIG. 3 shows the relation between the main heads and the auxiliary heads in perspective view.
Figure 4:
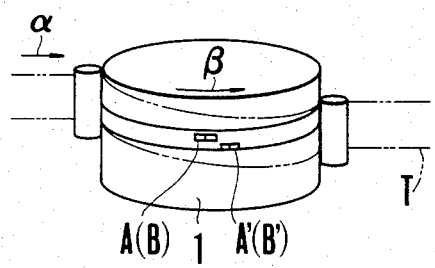
FIG. 4 shows the relation between the main heads and the auxiliary heads in perspective view.

FIGS. 2, 3 and 4 show the positional relation between the main rotative head and the auxiliary head of the present invention in case of the two-head helical scan type VTR.

In a conventional two-head helical scan type VTR, as shown in FIG. 3, a magnetic tape T is wound and driven on a cylindrical tape guide drum 1, over an angle of 180°. An odd number field and an even number field are successively and constantly formed on the magnetic tape by rotary magnetic heads A and B provided in the drum at an angle of 180° to each other, and maving along separate tracks.

The above is shown in FIG. 2. In FIG. 2, OT is the odd number field track recorded with head A and ET is the even number field track recorded with head B. Arrow $\alpha$ shows the running direction of the tape, while arrow $\beta$ shows the rotation direction of the head.

In the embodiment shown in FIG. 2, the pair of heads A and B provide in the drum 1 of the conventional two-head helical scan type VTR at an angle of 180° to each other are the main rotation heads. Two heads A' and B' are auxiliary heads. The present invention is not limited to the helical scan type and the scanning can be carried out along the direction of the width of the tape. Further, the number of the heads is not limited to two.

In the embodiment shown in FIG. 2, the auxiliary heads A' and B' are positioned on the track 2n fields (n=integral number) in advance of the main heads A and B. FIG. 2 shows the case of n=1. Now, the main heads A and B are respectively positioned at the writing end and the writing start of OT1 and ET1, while the auxiliary heads A' and B' are respectively positioned at the position 2 fields in advance of the main heads A and B, at the writing end and the writing start of the tracks OT0 and ET0 which have not yet been traced with the main heads A and B.

Consequently, when the main head A(B) is in the m-th horizontal scanning period of a certain field, the auxiliary head A'(B') is in the m-th horizontal scanning period 2n fields ahead.

The already recorded signal on the magnetic tape is reproduced with the auxiliary heads, while the signal reproduced with the auxiliary heads is mixed with the signal to be recorded and successively recorded with the main heads. The ratio of the already recorded signal to that to be recorded is varied such that the already recorded signal is made to fade out, while the signal to be recorded is made to fade in.

In the embodiment shown in FIG. 2, the auxiliary heads are positioned 2n fields in advance of the main heads such that the signals can be effectively mixed without a special delay circuit.

In other words, it is sufficient that the auxiliary heads can trace the track in advance of the main heads, and the output of the auxiliary heads is mixed with the signal to be recorded via a proper delay circuit.

Figure 5:
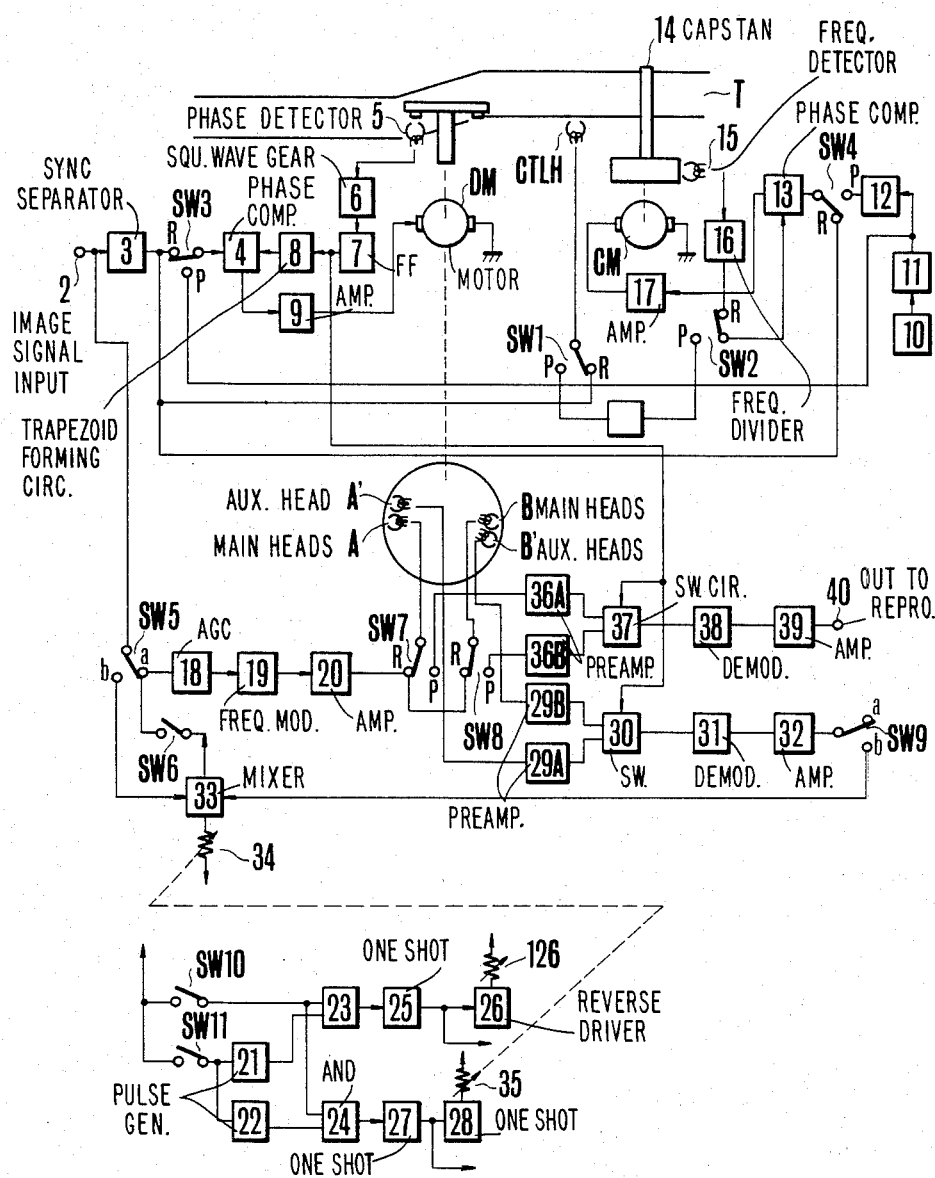
FIG. 5 shows an example of a control circuit.

FIG. 5 shows a principal block diagram of an embodiment of the VTR control circuit of the present invention. The circuit includes an image signal input terminal 2, a synchronization separation circuit 3, a drum servo system 4–9, a capstan servo system 13–17, a recording system 18–20, a main head reproducing system 36A, 36B, 37–39, an auxiliary head reproducing system 29A, 29B, 30–32, an overlap control system 21–28 and switches SW1–SW4, SW7 and SW8 operatively engaged for change-over between the recording and reproducing mode. The switches are connected to the corresponding contacts P in the reproducing mode and to the corresponding contacts R is the recording mode.

Switches SW5, SW6, SW9 and SW10 are operatively engaged for change-over between the special mode and the normal mode. The switches SW5 and SW6 are connected to the contacts a in the normal mode and the contacts b in the special mode.

Figure 6:
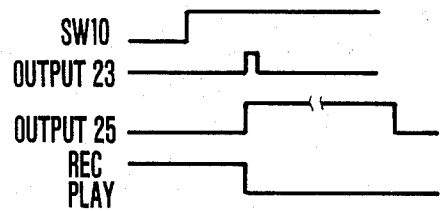
FIG. 6 shows timing charts.
Figure 6:
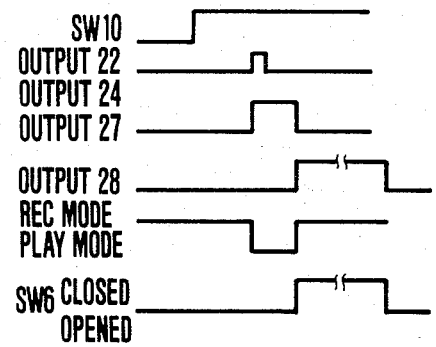

The operation is explained with reference to FIGS. 5 and 6. At the time of the recording the image signal is applied to the input terminal 2, separated by the synchronization circuit 3, divided in ½ in frequency and applied to the phase comparator 4 via the switch SW3. On the other hand, the rotation phase of the rotation head is detected with the detector 5, which triggers the flip-flop circuit 7 via the block 6 composed of two monostable multivibrators. The latter forms square waves of 30 Hz in synchronism with the rotation phase of the rotation heads, which waves are reformed into trapezoidal waves by the circuit 8. The reformed trapezoidal wave and the signal separated from the above image signal and divided by ½ in frequency are compared in the phase comparator 4 in phase so as to obtain an error voltage corresponding to the phase error.

By applying the error voltage to the driving amplifier 9 of the drum motor DM, the rotation phase of the rotation head is synchronized with the vertical synchronization signal of the above recording image signal.

At the time of the recording, by making use of the signal separated from the above image signal and divided in ½ in frequency, the CTL (control) signal is recorded on the one side edge of the tape with the CTL head CTLH via the R terminal of the switch SW1.

On the other hand, in the capstan control system the signal (30 Hz) separated from the image signal is applied to the phase comparator 13 via the switch SW4 at the time of the recording. The frequency detected with the head 15 for detecting the frequency corresponding to the rotation speed of the capstan 14 is divided in 30 Hz in frequency with the frequency divider 16. This is applied to the phase comparator 13 via the switch SW2 so as to be compared with the signal (30 Hz) separated from the image signal in phase to obtain the error voltage. The latter is applied to the driving amplifier 17 of the capstan motor in such a manner that the capstan motor CM drives the magnetic tape T at a constant speed.

On the other hand, the gain of the image signal delivered to the input terminal 2 is controlled at a predetermined level with the AGC circuit 18 via the switch 5 in the normal recording mode, then modulated in frequency with the frequency modulator 19, amplified with the recording amplifier 20, delivered to the main heads A and B via the switch SW7 and SW8 and recorded on the tape.

The structure and the operation for changing the scene with the special mode such as overlapping according to the present invention will be explained in connection with the above recording operation.

Element SW10 is the switch to be closed when the scene before the overlap recording is recorded and SW11 the switch to be closed with the closure of the trigger switch in case of the camera photographing and with the release of the pause switch and so on in case of VTR. Elements 21 and 22 are respective pulse generators for producing a pulse with the opening and the closing of the switch SW11, members 23 and 24 AND gates, 25 a first one shot circuit, 26 a capstan motor reverse drive control circuit for inversely driving the tape only while a high level signal is produced with the one shot circuit, 27 a second one shot circuit, and 28 a third one shot circuit.

When the trigger switch is opened (or the pause switch is closed) after the overlap switch SW10 is closed in advance, the switch SW11 is opened and the pulse generator 21 produces a high level signal. Thus, the AND gate 23 also produces a high level output in such a manner that the first one shot circuit 25 produces a high level signal for a predetermined time. Thus, the tape is rewound with the motor reverse drive control circuit 26 for the predetermined time. Further, so far as the one shot circuit 25 delivers a high level output, the switches SW1-SW4, SW7 and SW8 and so on are changed over out of the recording mode (R) into the reproduction mode (P), or the current supply to the heads A and B are interrupted. In this way the above recorded signal is not erased while the tape is inversely driven. Then, in operative engagement with the rising up of the output of the one shot circuit 25 the not shown pinch roller is freed and the VTR is brought in the short time stop mode.

The time during which the one shot circuit 25 produces a high level signal is automatically with the resistance 126 or manually set in advance in such a manner that, as will be explained later, the reproduction servo system rises up and the recorded signal is brought back into the position at which the signal for several feet is reproduced when the tape is inversely driven.

Further, in the special mode of the present invention it is not necessary to rewind the tape as in the case of the present invention.

Namely, the auxiliary heads trace the track by several tracks in advance with the main heads so that it is possible to change the scene of the present invention merely by opening the trigger switch of the camera or by closing the pause switch of the VTR so as to stop the tape or the recording.

The signal to be recorded and superposed on the recorded signal is applied to the input terminal 2 and the camera is triggered (or the pause switch of the VTR is opened) after the change of scene has been prepared. The switch SW11 is then closed and the pulse generator 22 delivers a high level signal. Thus, the AND gate 24 delivers a high level output, while the second one shot circuit 27 delivers a high level signal for a certain determined time.

Then, the control system excepting the switches SW3 and SW4 are in the reproduction mode while the one shot circuit 27 delivers a high level signal. Thus, the rotating heads rotate in phase synchronism with the signal separated from the signal to be recorded, while in the capstan servo system, the 30 Hz signal separated from the signal to be recorded and the CTL signal reproduced with the CTL head are compared in the phase comparator 13 so as to obtain the output error voltage. This drives the capstan motor CM via the capstan drive amplifier 17. Further, after the one shot circuit 27 delivers a high level signal the not shown pinch roller presses the tape against the capstan 14.

In this way, the time constant of the above one shot circuit 27 is set in such a manner that while the above one shot circuit 27 delivers an output, the capstan and the drum servo system rise up and the main heads A and B trace the track of the recorded signal again.

With the descent in the output of the one shot circuit 27 the third one shot circuit 28 delivers an output for a certain determined time. With the rise of this output the remaining swtiches SW1, SW2, SW7 and SW8 are changed over into the recording mode, while the switch SW5 is changed over to the terminal b only while the third one shot circuit 28 delivers an output and the switch SW6 is closed.

Consequently, at this time the main heads A and B are changed over to the recording side, while, as is explained above, the auxiliary heads A' and B' reproduce the signal by 2n field in advance to the main heads A and B. The signal reproduced with the auxiliary heads A' and B' is reproduced with the pre-amplifier 29A and 29B, while with the output signal of the flip-flop 7, A' and B' are alternatively switched on. The odd number fields and the integral number fields are made to a continuous signal via the switching circuit 30, then demodulated with the demodulator 31, amplified with the power amplifier 32 and applied to the mixer 33 via the switch SW9 to be changed over to the b side in operative engagement with the closing of the overlap switch SW10. With the mixer 33 the recorder signal reproduced with the auxiliary heads A' and B' and the signal to be recorded which comes via the input terminal 2 and the SW7 are mixed and recorded on the tape with the main head A and B.

Now let us suppose than n=1 and the mixing ratio of the mixer 33 is 1:1. Then, at the time at which the timing switch circuit 28 delivers an output, the output of the power amplifier 32 and the signal to be recorded are mixed at the ratio 1:1 and recorded on the magnetic tape with the main heads A and B. Further, when the main heads A and B record the next frame, the output of the auxiliary heads A' and B' is the reproduced signal composed of the signal recorded with the main heads A and B one frame in advance and the signal to be recorded at the ratio of 1:1, so that the ratio of the former signal in the output signal of the mixer 33 is $\frac{1}{4}$. In this way, after the m frames the above ratio is $\frac{1}{2}^m$. Namely, the former signal is gradually attenuated.

If the mixing ratio of the mixer 33 is set P:1, after the m frames the ratio of the former signal is $(9/p+1)^m$.

Consequently, merely by adjusting the mixing ratio of the mixer the fade in and the fade out time of the overlap portion can also be controlled.

That is, the larger the value P is, the more slow the fade in and the fade out are so as to prolong the overlap time. Further, the value P can be adjusted with the variable resistance 34. Further, with the rise of the output of the timing switch circuit 28 the SW6 is closed, while the SW5 is set at the a side.

It is desirable that the voltage of the timing switch circuit 28 drop immediately after the recorded signal has been attenuated to some extent and a proper time constant can be set in operative engagement of the variable resistance 34 in accordance with the overlap time.

FIG. 5 elements 36A and 36B are respective preamplifiers for the main heads A and B, 37 the reproducing switching circuit, 38 the demodulator, 39 the power amplifier and 40 the output terminal for the normal reproduction.

In the above embodiment the one reproduction system is provided for the main heads and the other one for the auxiliary heads, and they can be combined so as to be used in common and the blocks of the preamplifiers 36A and 36B, the reproducing switching circuit 37, the demodulator 38 and the power amplifier 39 can be replaced with 29A, 29B, 30, 31 and 32. In such a case it is sufficient that at the time of the reproduction the output of the main heads A and B is delivered to 29A and 29B instead of the auxiliary heads A' and B'.

In the above embodiment the normal image signal is presumed to be the recorded signal, and if the image is for example a black level image signal of a predetermined brightness the fade out effect can effectively be obtained, while if the image is a white level image signal, the fade in effect can be obtained in a simple way. The above effect can be obtained with one VTR if the VTR or the camera is provided with a signal generator for producing such a standard signal. Further, it is possible to cut or amplify only the brightness component of the image signal from the image signal input terminal and then deliver the signal to the mixer.

The same effect can be obtained by closing or totally opening the diaphragm on the camera side. The operation becomes simple if the aperture control is operatively engaged with the one shot circuits 27, 28 and so on.

Figure 7:
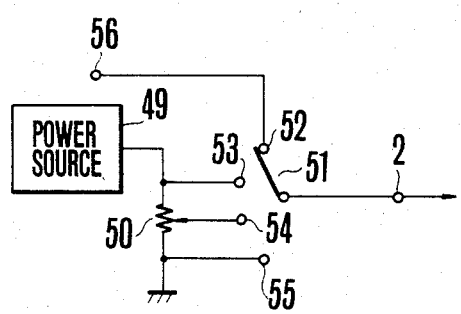
FIG. 7 shows the producing circuit of the second image signal to be overlapped.

FIG. 7 shows a simple example of the generator of the recorded signal. In the drawing element 49 is the power source, 50 the variable resistance and 51 the change-over switch. When the switch 51 is connected to the contact 52, the external image signal from the video camera or other VTR is delivered to the input terminal, when 51 is connected to the contact 53, the white level signal is delivered, when 51 is connected to the contact 54 the signal with a constant brightness is delivered and when 51 is connected to the contact 55 the black level signal is delivered.

As is explained so far in accordance with the present invention with the one VTR the overlap recording is easily possible, while the overlap time can be adjusted with a simple composition and further the operation is remarkably simple, which is quite advantageous.

The present invention is not limited to the aforementioned embodiments but can be modified in many variation within the gist of the claim.

I claim:

1. A video signal recording and reproducing apparatus, comprising:
   (a) a recording head for recording a first video signal on a recording medium;
   (b) a reproducing means for tracing a track traced by the recording head after an elapse of a predetermined period of time and reproducing the first video signal;
   (c) applying means for applying a second video signal;
   (d) mixing means for mixing the first video signal with the second video signal to form a third video signal and for supplying the third video signal to the recording head.

2. An apparatus according to claim 1, wherein the second video signal includes a luminance signal of a given level.

3. An apparatus according to claim 2, wherein the level of said luminance signal is a white level.

4. An apparatus according to claim 2, wherein the level of said luminance signal is a black level.

5. An apparatus according to claim 1, wherein the mixing means includes an adjusting circuit for adjusting a mixing ratio of the first video signal to the second video signal.

6. An apparatus according to claim 1, wherein the reproducing head traces the track traced by the recording head with a delay substantially an integer times a period of time corresponding to one field of the video signal.

7. An apparatus according to claim 6, wherein the first video signal having an even number field signal and an odd number field signal.

8. An apparatus according to claim 7, wherein the reproducing head traces the track traced by the recording head with a delay substantially an even number of times a period of time corresponding to one field of the video signal.

9. An apparatus according to claim 7, wherein said one of the recording head and the reproducing head has a head for the even number field signal and a head for the odd number field signal.

10. An apparatus according to claim 1, wherein the recording head and the reproducing head are rotation heads which rotate in a guide body accompanied by the recording medium.

11. A video signal recording and reproducing apparatus, comprising:
   (a) a first head for recording a video signal on a recording medium and reproducing the video signal from the recording medium;
   (b) a second head for reproducing the video signal from the recording medium with a timing different from that of the first head;
   (c) a modulation circuit for modulating a video signal supplied to the first head;
   (d) a first demodulation circuit for demodulating the video signal reproduced by the first head; and
   (e) a second demodulation circuit for demodulating the video signal reproduced by the second head.

12. An information signal reproducing apparatus, comprising:
   (a) a first head for reproducing a modulated information signal from a recording medium;
   (b) a second head for reproducing the modulated information signal with a timing different from that of the first head.
   (c) a first demodulation circuit for demodulating the modulated information signal reproduced by the first head; and
   (d) a second demodulation circuit for demodulating the modulated information signal reproduced by the second head.

* * * * *